Nov. 3, 1936.  H. F. MORSE  2,059,891
BEARING STRUCTURE FOR ELECTRIC MOTORS AND THE LIKE
Filed Oct. 28, 1933
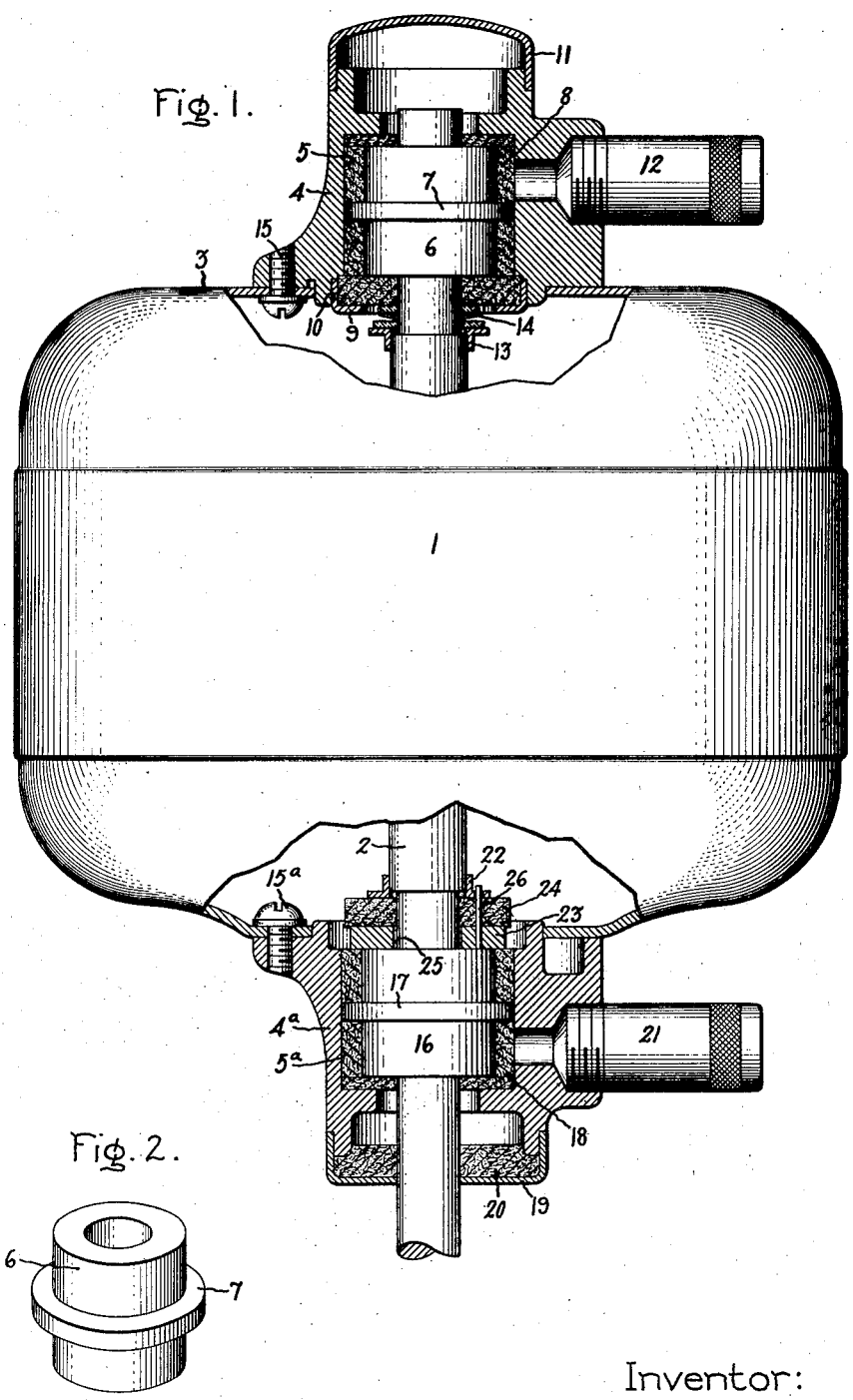
Inventor:
Harold F. Morse,
by Harry E. Dunham
His Attorney.

Patented Nov. 3, 1936

2,059,891

UNITED STATES PATENT OFFICE 2,059,891

BEARING STRUCTURE FOR ELECTRIC MOTORS AND THE LIKE

Harold F. Morse, Southport, Conn., assignor to General Electric Company, a corporation of New York Application October 28, 1933, Serial No. 695,628

2 Claims. (Cl. 308—26)

The present invention relates to bearing structures for electric motors and the like, and especially bearing structures wherein the shaft which is mounted in the bearings stands in a vertical position. The invention is well adapted for use in electric motors for fans wherein the fan is intended to be mounted from a ceiling, for example, so that the motor shaft runs in a vertical position. This requires that at least one of the bearings shall serve as a thrust bearing.

The object of my invention is to provide a bearing structure which is self aligning, simple in structure, efficient in operation, and capable of being manufactured at low cost.

For a consideration of what I believe to be novel and my invention, attention is directed to the accompanying description and the claims appended thereto.

In the drawing, Fig. 1 is a side elevation, partly in section, of an electric motor, which may be a fan motor, equipped with bearings embodying my invention, and Fig. 2 is a detailed perspective view of a part of the bearing structure.

Referring to the drawing, I indicates the casing of an electric motor and 2 indicates its shaft. The specific structure of the motor forms no part of the present invention. Accordingly, it is shown only in outline.

Attached to the upper end wall 3 of the motor casing is a bearing housing 4 which provides a chamber 5 in which is mounted a bearing block 6. Bearing block 6 is formed from a self-lubricating bearing metal. It may comprise a suitable metal impregnated with a lubricant and sufficiently porous to be capable of taking up additional lubricant. Such bearings are known and are termed usually porous bearings. However, if found desirable, a bearing material other than a self-lubricating bearing material may be used, a lubricant being supplied to it by a suitable means. Bearing block 6 is provided at its central portion with a collar 7 of relatively narrow width which engages the side-wall surface of chamber 5. Except for collar 7, bearing block 6 is spaced from the walls of chamber 5. In other words, bearing block 6 is mounted in chamber 5 but engages the side wall of the chamber over a limited area only. By this arrangement, the bearing block can be moved slightly in the bearing housing. Collar 7 is located equidistant from the ends of block 6 so as to balance and equalize the bearing load over the entire bearing length. Packed around bearing block 6 are suitable felt washers 8 which cover it on all sides, the lower felt washer being held in place by a retaining ring 9 which fits tightly in a recess 10 in bearing housing 4. The upper end of bearing housing 4 is closed by a cap 11. At one side of the bearing housing is a suitable grease cup 12 for use in supplying lubricant to the bearing. On shaft 2, beneath retaining ring 9, is a thrust collar 13 between which and the lower felt washer 8 is located one or more washers for limiting end play of the motor shaft. I may use ordinary washers or a spring washer. In the present instance I have shown a spring washer 14 adapted to yield in an axial direction. Spring washer 14 serves to cushion and limit end play of the motor shaft. It may be of any suitable construction. In the present instance I have indicated a construction similar to that shown in the application of William K. Skolfield, Serial No. 692,642, filed October 7, 1933. The bearing housing 4 is fastened in position by a suitable number of screws 15. Bearing block 6 is shown in perspective in Fig. 2.

The lower bearing structure is similar generally to the upper bearing structure except that it embodies a thrust bearing to take the weight of the motor armature and shaft. It comprises a bearing housing 4a fastened to the lower end wall of the motor casing by a suitable number of screws 15a. It provides a bearing chamber 5a in which is located a bearing block 16 similar to bearing block 6 and provided with a centrally located collar 17 which engages the side wall of chamber 5a over a limited area, the block being otherwise spaced from the walls of the chamber by felt washers 18. The lower end of housing 4a is closed by a cap 19 which holds in place the felt washer 20. At 21 is a lubricating device similar to device 12.

In connection with the lower bearing structure, there is provided a thrust bearing comprising a thrust collar 22 fixed to shaft 2, a thrust washer 23 which is loose on shaft 2, and a felt washer 24 located between the collar 22 and washer 23, and capable of being compressed between them. There is a slight clearance between shaft 2 and thrust washer 23 as is indicated at 25. Thrust washer 23 and felt washer 24 are attached to thrust collar 22 so as to turn therewith by means of a pin 26 which is fixed in an opening in thrust washer 23 and projects upwardly through openings in felt washer 24 and thrust collar 22, the opening in the thrust collar being of a diameter greater than that of pin 26 so that the pin fits loosely therein. The lower surface of thrust washer 23 rests on the upper surface of bearing block 16 and runs thereon.

The washer or washers 14 serve to limit end play of the motor shaft so as to prevent thrust collar 22 from becoming disengaged from pin 26.

With the above-described arrangement, it will be seen that the thrust washer 23, felt washer 24, and thrust collar 22 form a thrust bearing structure which moves as a unit with the shaft but wherein the thrust washer 23 may tilt relatively to thrust collar 22 due to the fact that the felt washer 24 may be compressed somewhat. With this arrangement therefore the thrust washer 23 is capable of aligning itself correctly with the top surface of bearing block 16, the felt washer yielding to permit of this. The oversize opening in thrust collar 22 permits of the necessary slight movement of pin 26 required when the thrust washer aligns itself with the top surface of the bearing block.

The shaft 2 runs in the bearing blocks 6 and 16 as is well understood. If the parts are slightly out of alignment, bearing blocks 6 and 16 can move slightly in their bearing chambers because of the limited area over which they are in contact with the side walls of the chambers, thus permitting the bearing blocks to line up correctly with the shaft. At the same time, the thrust bearing structure can align itself with the bearing block 16 in the manner already described. With this arrangement, therefore, any slight inaccuracies in bearing alignment and any unevenness in wear are automatically taken care of. At the same time, however, the bearings are held sufficiently rigid to insure proper operation of the motor.

What I claim as new and desire to secure by Letters Patent of the United States, is:

1. In combination, a bearing housing, a self-aligning bearing in said housing, a shaft rotatably mounted in said bearing, a thrust collar fixed on the shaft, a thrust washer loose on the shaft and engaging the bearing, and yielding means located between the collar and the washer.

2. In combination, a bearing housing, a self-aligning bearing in said housing, a shaft rotatably mounted in said bearing, a thrust collar fixed on the shaft, a thrust washer loose on the shaft and engaging the bearing, yielding means located between the collar and the washer, and means connecting the washer to the collar to cause it to turn therewith.

HAROLD F. MORSE.